Feb. 20, 1973   HIROSHI TAKAO ET AL   3,717,046
AUTOMOTIVE STEERING COLUMN
Filed Sept. 10, 1970   3 Sheets-Sheet 1

INVENTORS
HIROSHI TAKAO
HIROSHI SEINO

United States Patent Office
3,717,046
Patented Feb. 20, 1973

3,717,046
AUTOMOTIVE STEERING COLUMN
Hiroshi Takao and Hiroshi Seino, Yokohama, Japan, assignors to Nissan Motor Company Limited, Yokohama, Japan
Filed Sept. 10, 1970, Ser. No. 71,146
Claims priority, application Japan, Sept. 10, 1969, 44/71,199
Int. Cl. B62d 1/18
U.S. Cl. 74—492                                    1 Claim

ABSTRACT OF THE DISCLOSURE

A steering column for a motor vehicle adapted to damp a violent mechanical impact carried thereto as in case of a collision of the motor vehicle, which steering column is provided with an inner sleeve enclosing the steering column, an outer sleeve into which the inner sleeve is inserted partly slidably in an axial direction, and at least one shear pin or retaining member constraining the inner and outer sleeves to each other, the shear pin or the retaining member being made inoperative when subjected to a violent mechanical impact so that the inner sleeve is permitted to slide within the outer sleeve through a limited length, whereby a portion of the mechanical impact is absorbed when the shear pin or the retaining member is made inoperative and the remaining portion of the impact which is damped at this instant is absorbed while the inner sleeve is being moved through the limited length and brought to a full stop in the outer sleeve.

---

This invention relates to a steering system of a motor vehicle and, more particularly, to a steering column of the type adapted to damp a mechanical impact carried thereto when the motor vehicle encounters a collision.

It is evident that, in case of a collision of a motor vehicle, the driver of the motor vehicle receives a sudden violent mechanical impact on him from the vehicle body through the steering column. Such mechanical impact carried to the vehicle driver could be minimized if the steering column is freed from any mechanical constraint. Actually, however, the steering column must be supported by some structural member or members with the result that the driver is subjected to an impact that is more or less greater than such minimized or imaginary mechanical impact when the vehicle encounters a collision.

Experiments have revealed that the mechanical impact on the steering column or the vehicle driver reaches the first peak value about 14 milli-seconds after the impact has been initiated. It, therefore, will prove beneficial for the purpose of reducing the mechanical impact imparted to the vehicle driver to have the steering column supported with a reduced force before the impact reaches the first peak value and to thereafter have a major portion of the impact damped in a suitable manner.

Thus, according to this invention, the mechanical impact to the steering column is damped primarily by reducing the mechanical constraint on the steering column as soon as the mechanical impact is carried thereon and secondarily the remaining portion of the mechanical impact which is more or less damped at this instant is absorbed by means of an impact absorbing mechanism which is provided on the steering column.

The invention is specifically directed to a steering column having an impact absorbing arrangement of the type which is made up of an inner sleeve enclosing the steering shaft and an outer sleeve into which the inner sleeve is inserted slidably, wherein the inner sleeve is moved through a limited length within the outer sleeve when subjected to a sudden violent mechanical impact is damped by the time at which the inner sleeve is brought to a full stop.

Figure 1:
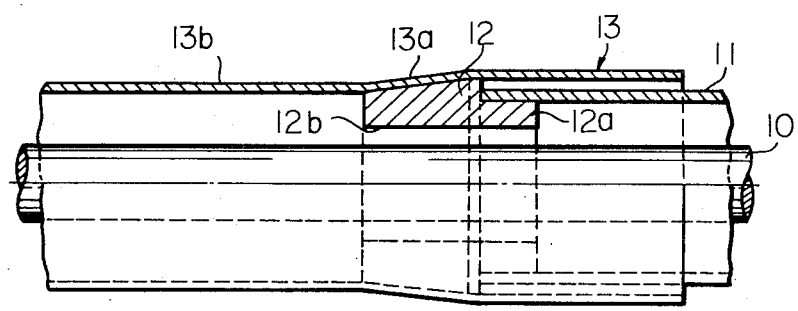
FIG. 1 is a longitudinal sectional view of a steering column incorporating a conventional impact absorbing arrangement.

Referring to FIG. 1, a portion of the steering column is illustrated. A steering shaft 10 is connected at one end to a steering gear and at the other to a steering wheel, though not shown. The steering column is provided with a known impact absorbing arrangement which essentially consists of an inner sleeve 11 enclosing a limited portion of the steering shaft 10, a frusto-conical member 12 which is attached to a tip portion of the inner sleeve 11 through a boss 12a extending therefrom and which is bored as at 12b to pass the steering column 10 therethrough, and an outer sleeve 13 into which the inner sleeve 11 is axially slidably inserted and which is provided with a section 13a which is tapered to be internally engageable with the frusto-conical member 12 when the inner sleeve 11 is moved responsive to a mechanical impact carried thereto as illustrated. The tapered section 13a of the outer sleeve 13 merges with a section 13b which is reduced in diameter.

Figure 2:
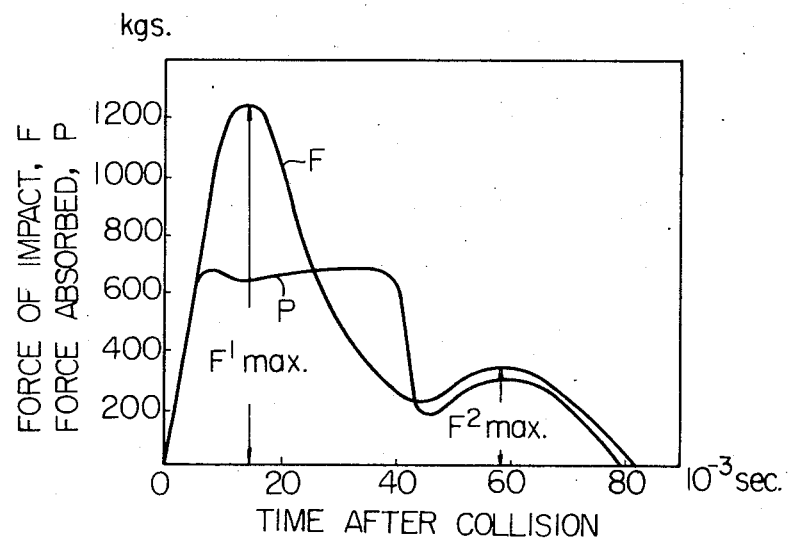
FIG. 2 is a view showing characteristics curves which indicate the variations, against time in milli-seconds elapsed after the mechanical impact has been initiated, of a force of the impact on a vehicle driver and a force of the impact absorbed by the impact absorbing arrangement shown in FIG. 1.

The inner sleeve 11, when positioned in a normal state, is spaced apart from the tapered section 13a of the outer sleeve 13 and, when a violent mechanical impact is carried to the inner and outer sleeves 11 and 13, respectively, then the inner sleeve 11 is axially moved to a position in which the frusto-conical member 12 fast on the sleeve 11 engages with the tapered section 13a. The impact is thus absorbed by the relative movements of the inner and outer sleeves 11 and 13, respectively.

Where the arrangement shown in FIG. 1 is combined with the steering column, the force, F, of the impact to be carried to the vehicle driver and the force, P, of the impact absorbed vary with the time elapsed after the impact has been initiated as in the case of a collision of the motor vehicle as indicated by the characteristics curves F and P, respectively, in FIG. 2. From the graphical representation of FIG. 2, it is obvious that the force F of the impact peaks up twice in the time duration after collision as indicated at $F^1_{max.}$ and $F^2_{max.}$, the former being far greater than the latter.

If, now, it is desired to have the first peak value $F^1_{max.}$ reduced by reducing the overall diameter of the frusto-conical member 12 or by increasing the overall diameter of the outer sleeve 13, the steering column 10 must be designed to be able to travel through a disproportionately increased distance. If, conversely, the frusto-conical member 12 is tapered at such an angle as to shorten the travelling distance of the steering column 10, then the peak value $F^1_{max.}$ of the impact force will be so great as to hazard the driver's life. Thus, the arrangement of FIG. 1 has an inherent drawback in that the arrangement must be designed at the sacrifice of either the impact absorbing capacity or the travelling distance of the steering column, both being incompatible with each other.

This invention thus contemplates to reduce the impact energy to be carried to the vehicle driver without increasing the travelling distance of the steering column.

A first embodiment of the invention, arranged on the basic concept discussed previously, is illustrated in FIG. 3, wherein an improvement is incorporated into the arrangement of FIG. 1 and wherein like reference numerals are allocated to the corresponding parts.

As illustrated, the steering shaft, designated by 10, is provided with a first or an inner sleeve 11 enclosing the steering shaft 10, a cone shape or a frusto-conical member 12 mounted on the tip portion of the inner sleeve 11 through a boss 12a, and a second or an outer sleeve 13 into which the inner sleeve 11 is axially slidably inserted. The frusto-conical member 12 is axially hollowed to form a bore 12b through which the steering column 10 is passed and the boss 12a is inserted tightly into the tip portion of the inner sleeve 11 and fixed thereto by spot-welding as at 12c. The outer sleeve 13 has a deformable section 13a which is tapered in the same direction and at the same angle as the frusto-conical member 12. The member 12 and the section 13a are herein shown as tapered at an angle of about 7 degrees. The tapered section 13a merges with a section 13b which is reduced in diameter.

Figure 3:
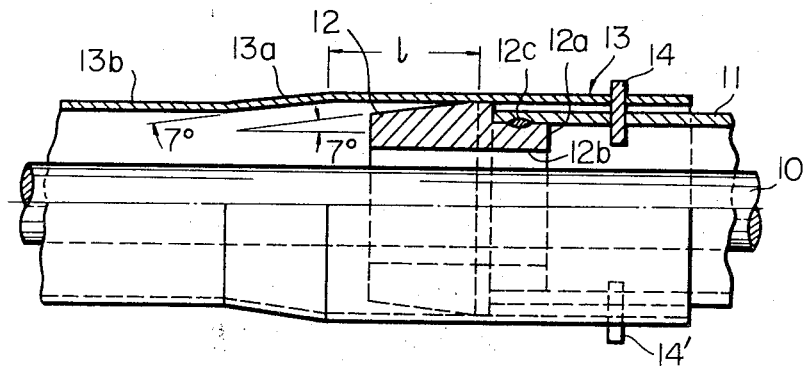
FIGS. 3, 4 and 5 are longitudinal sectional views illustrating preferred embodiments of the invention.

In the embodiment shown in FIG. 3, means is provided to constrain the inner and outer sleeves to each other with a selected binding force. Such constraining means is herein constituted as at least one shear pin, shown as two in number by reference numerals 14 and 14'. The shear pins 14 and 14' are secured to the inner and outer sleeves 11 and 13, respectively, so that the two sleeves are bound to each other with the selected force. The shear pins 14 and 14' are selected to have a mechanical strength which is resistible to a shearing stress smaller than a predetermined upper limit. The inner and outer sleeves 11 and 13, respectively, are positioned relative to each other in such a manner that the frusto-conical member 12 is spaced apart from the tapered section 13a at a selected distance $l$, which may preferably be determined in a manner hereinafter discussed.

When, now, a mechanical impact is carried to the inner and outer sleeves, 11 and 13, respectively then the inner and outer sleeves are subjected to a force that acts to force the sleeves to move relative to each other. This causes the shear pins 14 and 14' to be broken or sheared so that a portion of the energy of the impact, which has been consumed in breaking the pins 14 and 14', is damped or absorbed. The inner and outer sleeves being thus released from each other, the inner sleeve 11 is axially moved through the length $l$ relative to and within the outer sleeve and is brought to a stop in a relative position in which the frusto-conical member 12 tightly engages with the tapered section 13a. During movement of the inner sleeve 11 to this relative position, the impact force reaches the first peak value $F^1_{max}$. After then the frusto-conical member 12 hits against the tapered section 13a. The impact force F is reduced as the reduced section 13a of the outer sleeve 13 is expanded or deformed by an ingress thereinto of the frusto-conical member 12.

Figure 4:
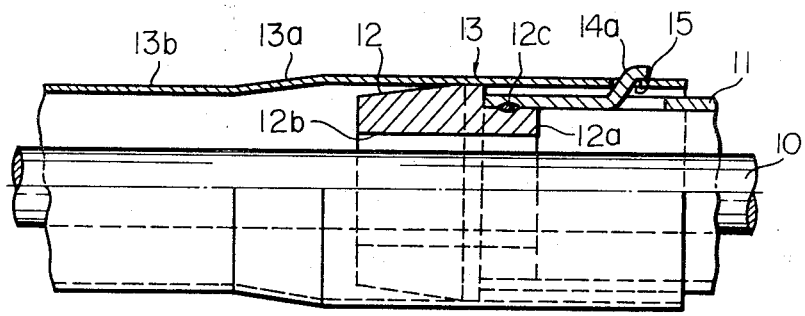

FIG. 4 illustrates a second preferred embodiment of the invention wherein the means to constrain the inner and outer sleeves 11 and 13, respectively, to each other is constituted as a retaining means 14a, wherein the outer parts are entirely identical to those of FIG. 3 and hence are designated by like reference numerals. The retaining member 14a is herein shown as integral with the inner sleeve 11 and tightly fitted to the outer sleeve 13 through a hole 15 formed therein. The retaining member 14a is disengageably fitted to the outer sleeve 13 with a force resistible to a stress smaller than a predetermined upper limit. The retaining member 14a is forced to disengage or withdraw from the outer sleeve 13 through the hole 15 when subjected to a stress greater than the just mentioned predetermined upper limit, whereby the load of mechanical impact carried to the inner and outer sleeves 11 and 13, respectively, is damped or absorbed primarily before the inner sleeve 11 together with the frusto-conical member 12 is moved, relative to the outer sleeve 13, into engagement with the tapered section 13a for the secondary damping of the impact energy. It should be understood in this instance that the retaining member 14a may be integral with the outer sleeve 13 and fitted disengageably to the inner force, conversely to the arrangement of FIG. 4. The retaining member 14a serves essentially in the same manner as the shear pin 14, made inoperative to hold the sleeves 11 and 13 together when subjected to a stress greater than the aforesaid upper limit. The retaining member 14a may be provided in any desired number, although only one retaining member is herein illustrated.

Figure 5:
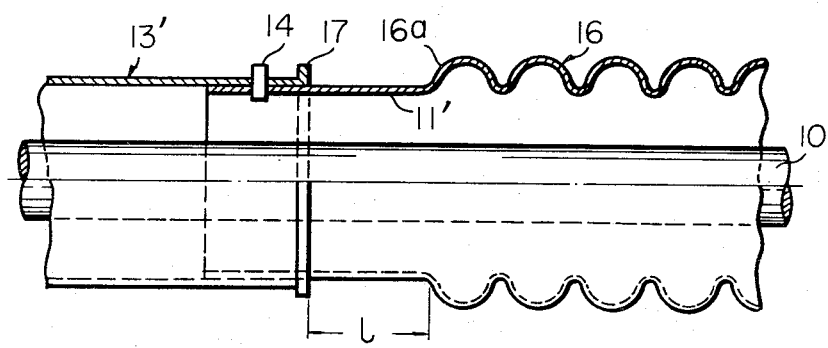

Illustrated in FIG. 5 is a third embodiment of the invention wherein the steering column 10 is enclosed by a second or an inner sleeve 11' which is provided with a bellows section 16 extending therefrom and flexible when subjected to a compressing force in the axial direction. The inner sleeve 11' is inserted into a first or an outer sleeve 13' which has a flange 17 at its end facing the bellows section 16 of the inner sleeve 11. The inner and outer sleeves 11' and 13', respectively, are positioned relative to each other in such a manner that the bellows 16 terminates at 16a which is spaced apart at length $l$ from the flange 17 of the outer sleeve 13'. The inner and outer sleeves thus positioned relative to each other are held together by means of a shear pin 14 which is similar in function to the counterpart of FIG. 3. The shear pin 14 shown as used in the arrangement of FIG. 5 may be substituted for a retaining member which is used in the arrangement of FIG. 4, if desired. In the arrangement shown in FIG. 5, the mechanical impact carried to the steering column 10 is damped primarily when a portion thereof is consumed in breaking the shear pin 14 and secondarily when the inner sleeve 11' is relative to the outer sleeve 13' moved to a position in which the bellows section 16 contacts at 16a with the flange 17 whereupon the bellows section 16 is compressed and contracted to absorb the remaining impact energy. The flange 17 in this instance serves as a stop member limiting the displacement of the bellows section 16.

Figure 6:
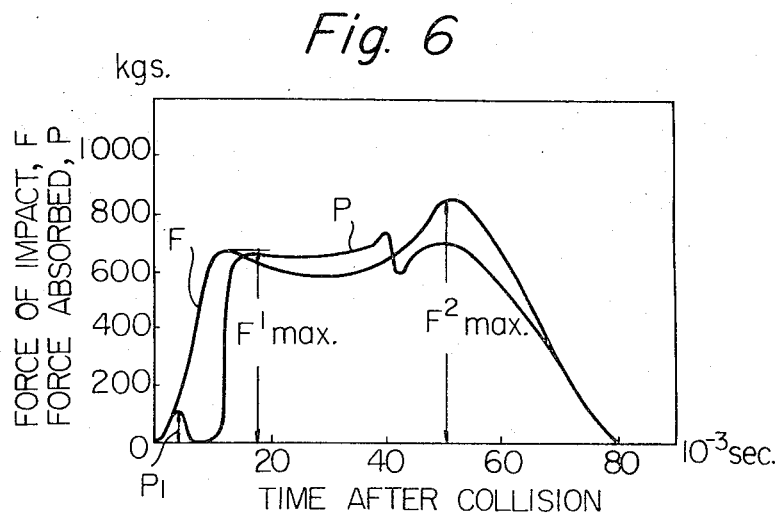
FIG. 6 is a view similar to FIG. 2 but the characteristics curves herein shown are attained in the embodiments shown in FIGS. 3, 4 and 5.

FIG. 6 illustrates characteristics curves of the impact force F imparted to the vehicle driver and the impact force P damped by the operation of the arrangement of FIG. 3 against time in milli-seconds after the impact is initiated as in the case of a collision of a motor vehicle. Here, the length $l$ between the frusto-conical member 12 and the tapered section 13a of the outer sleeve 13 is assumed to be 20 mm. and the total mechanical resistance of the shear pins 14 and 14' to a shearing stress is assumed to be about 110 kgs. As clearly seen in FIG. 6, the impact force P is damped in an amount indicated by the first peak point $P_1$ of the curve P when the shear pins 14 and 14' are broken. The force P then remains nothing while the inner sleeve 11, released from the outer sleeve 13 when the shear pins 14 and 14' were broken, is moved relative to and within the outer sleeve 13 until the frusto-conical member 12 attached to the leading end thereof is brought into contact with the tapered section 13a of the outer sleeve 13. While the inner sleeve 11 is moving relative to the outer sleeve 13, the impact force F to be carried to the vehicle driver reaches the first peak value $F^1_{max}$. Thus, the inner sleeve 11 hits the tapered section 13a while the impact force F is on a decreasing tendency, whereby the remaining impact force F is consumed in depressing and deforming the tapered section 13a. The peak value of the impact force F to be applied to the vehicle driver is in this manner significantly reduced as compared to prior art arrangement of FIG. 1 as will be appreciated from observation of the curves of FIG. 2. In fact, comparison between the curves F of FIGS. 2 and 6 indicates that the maximum impact on the vehicle driver can be reduced from the peak value $F^1_{max.}$ of about 1250 kgs. as in FIG. 2 to the peak value $F^2_{max.}$ of about 850 kgs. as in FIG. 6.

Now, the distance at which the steering column 10 is caused to travel after the frusto-conical member 12 is brought into contact with the tapered section 13a of the outer sleeve 13 can be shortened by a length corresponding to an amount of impact energy consumed in breaking the shear pins 14 and 14' as compared with the conventional arrangements such as shown in FIG. 1. Such a shortened travelling distance of the steering column 10 may be more or less offset by the provision of the length $l$ between the frusto-conical member 12 and the tapered section 13a in the arrangement of the invention. In this regard, suffice it to say that, according to experiments conducted by us have revealed that the travelling distance of the steering column 10 should be made longer only about 15 mm. if the length $l$ is 20 mm. and that such an increase in the travelling distance is practically negligible.

Figure 7:
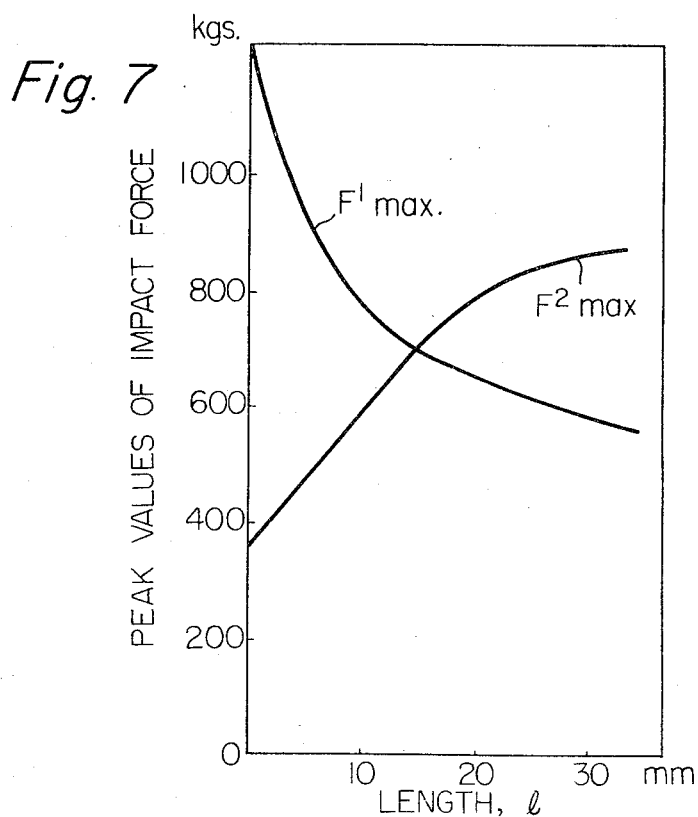
FIG. 7 is a view showing the characteristics curves indicating the variations, against the length in millimeters through which the inner sleeve is moved within the outer sleeve in the embodiments of the invention.

The length $l$ may be determined as a length at which the first and second peak values $F^1_{max.}$ and $F^2_{max.}$, respectively, are equal to each other. It may be advantageous for this purpose to use FIG. 7 in which the characteristics curves indicating the variations of the peak values $F^1_{max.}$ and $F^2_{max.}$ with length $l$. The preferred length $l$ is the length at which the curves $F^1_{max.}$ and $F^2_{max.}$ intersect each other.

What is claimed is:

1. A steering column assembly for a vehicle comprising: a first sleeve provided at one end thereof with a shock absorbing member, said first sleeve enclosing a portion of the steering shaft of said vehicle; a second sleeve enclosing the remaining portion of the steering shaft and axially aligned with said first sleeve, said second sleeve being provided with a deformable section which will be deformed by said shock absorbing member; and means constraining said first and said second sleeves at such an axially spaced relationship so that said shock absorbing member is axially apart from said deformable section at a certain distance wherein said means includes at least one retaining member which is integral with one of said first and second sleeves and which is disengageably fitted to the other one of said first and second sleeves through at least hole formed in the latter sleeve with a force resistible to a stress smaller than a predetermined upper limit corresponding to a predetermined level of the mechanical impact, said retaining member being withdrawn from said second sleeve through said hole when subjected to a stress greater than said upper limit whereby said first and second sleeves are released from each other.

References Cited

UNITED STATES PATENTS 3,482,653    12/1969    Maki et al. _____ 74—492

FOREIGN PATENTS 1,099,372    2/1961    Germany _____ 74—492

MILTON KAUFMAN, Primary Examiner

U.S. Cl. X.R.

188—1C